J. G. TAYLOR.
Improvement in Inclined Railways.

No. 128,674. Patented July 2, 1872.

Witnesses:
Jas. E. Hutchinson
C. L. Evert

Inventor,
John G. Taylor
per Alexander Mason
Attorneys.

UNITED STATES PATENT OFFICE.

JOHN G. TAYLOR, OF BALTIMORE, MARYLAND.

IMPROVEMENT IN INCLINED RAILWAYS.

Specification forming part of Letters Patent No. 128,674, dated July 2, 1872.

*To all whom it may concern:*

Be it known that I, JOHN G. TAYLOR, of Baltimore, in the county of Baltimore and in the State of Maryland, have invented certain new and useful Improvements in Inclined Railways; and do hereby declare that the following is a full, clear, and exact description thereof, reference being had to the accompanying drawing and to the letters of reference marked thereon making a part of this specification.

The nature of my invention consists in the construction and arrangement of an "inclined railway," as will be hereinafter more fully set forth.

In order to enable others skilled in the art to which my invention appertains to make and use the same, I will now proceed to describe its construction and operation, referring to the annexed drawing, in which—

Figure 1:
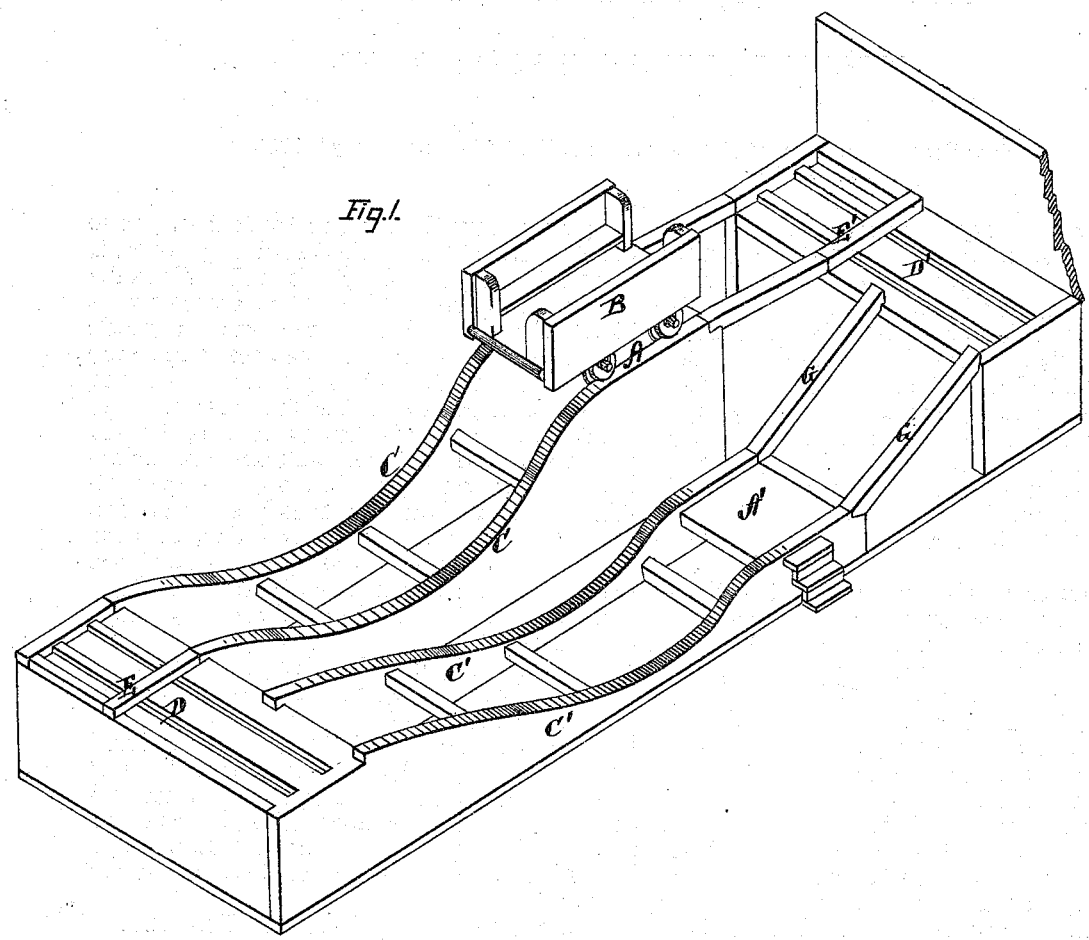
Figure 2:
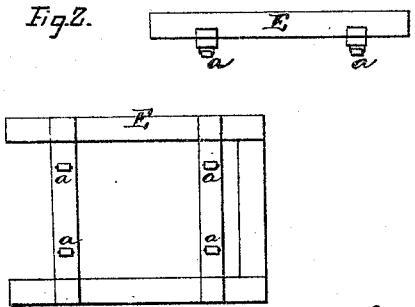

Figure 1 is a perspective view, showing my inclined railway; and Fig. 2 represents the switch or device for moving the car from one track to the other.

A represents the elevated platform with track, upon which the car B is placed, and where the passengers enter said car. The car B may be constructed in any suitable manner, with seats running lengthwise or crosswise of the car, as desired.

From the platform A the car is started, when it passes down the inclined track C and up to the platform D, said platform being elevated, but not as high as the platform A. When the car reaches the platform D it passes onto a switch or frame, E, moving sidewise on wheels $a\ a$, so that when the car has passed up on the same, it, with the car, may readily be moved sidewise to come opposite the other inclined track C'. The car is then again started, when it passes down said inclined track, and up onto the platform A', which is opposite the platform A, and where the passengers pass out. The car is then, by hand, moved up the incline G onto another switch or frame, E', and the same moved sidewise with the car, and then the car moved upon the platform A again for another trip.

Having thus fully described my invention, what I claim as new, and desire to secure by Letters Patent, is—

The combination of the double inclined tracks C C C' C' G with platforms A A' D D' and sliding switches E E', all constructed and arranged to operate substantially as set forth.

In testimony that I claim the foregoing I have hereunto set my hand this 6th day of May, 1872.

JOHN G. TAYLOR.

Witnesses:
A. N. MARR,
EDM. F. BROWN.